US012779834B2

(12) United States Patent
Capes et al.

(10) Patent No.: US 12,779,834 B2
(45) Date of Patent: *Nov. 3, 2026

(54) METHOD OF SPLICING A MULTI-LAYERED LAMINATE MATERIAL, SPLICED MULTI-LAYERED LAMINATE MATERIAL AND APPARATUS FOR SPLICING A MULTI-LAYERED LAMINATE MATERIAL

(71) Applicant: T.J. Smith and Nephew, Limited, Hull (GB)

(72) Inventors: Michael Antony Capes, London (GB); Iain Law McNaught, Preston (GB); David Eric Stephenson, Hull (GB)

(73) Assignee: T.J.Smith and Nephew, Limited, Hull (GB)

( * ) Notice: Subject to any disclaimer, the term of this patent is extended or adjusted under 35 U.S.C. 154(b) by 0 days.

This patent is subject to a terminal disclaimer.

(21) Appl. No.: 19/343,788

(22) Filed: Sep. 29, 2025

(65) Prior Publication Data

US 2026/0027816 A1 Jan. 29, 2026

Related U.S. Application Data

(63) Continuation of application No. 18/273,160, filed as application No. PCT/EP2022/051370 on Jan. 21, 2022, now Pat. No. 12,447,731.

(30) Foreign Application Priority Data

Jan. 21, 2021 (GB) ..................................... 2100822

(51) Int. Cl.
*B32B 38/10* (2006.01)
*B32B 37/02* (2006.01)
*B32B 37/12* (2006.01)

(52) U.S. Cl.
CPC .............. *B32B 38/10* (2013.01); *B32B 37/02* (2013.01); *B32B 37/12* (2013.01); *B32B 2535/00* (2013.01)

(58) Field of Classification Search
CPC . B29C 65/5042; B29C 65/7888; B29C 66/71; B29C 66/723; B29K 2075/00;
(Continued)

(56) References Cited

U.S. PATENT DOCUMENTS 12,447,731 B2 * 10/2025 Capes ................. B29C 65/5042
2010/0215884 A1 * 8/2010 Kitada ................ B29C 65/5021 156/60
2026/0027816 A1 * 1/2026 Capes ................. B29C 65/5042

OTHER PUBLICATIONS

Translation of WO2022157325.*

* cited by examiner

*Primary Examiner* — Sonya M Sengupta

(74) *Attorney, Agent, or Firm* — Knobbe, Martens, Olson & Bear, LLP

(57) ABSTRACT

The present invention relates to a method for splicing an upstream section and a downstream section of a multi-layered laminated sheet material wherein each section of the material comprises at least three layers each having first and second surfaces and wherein the at least three layers comprise first and second outer layers and at least one inner layer located between the first and second outer layers, comprising the steps of a) splicing together the upstream and downstream sections of both the first and second outer layers with a splicing material; b) removing the first outer layer from the multi-layered laminated sheet material to expose a surface of an inner layer; c) splicing the upstream and downstream sections of the exposed inner layer with a splicing material; and d) applying a replacement first outer layer to the exposed surface of the inner layer. A spliced (Continued)

multi-layered laminated sheet material produced according to the method is also provided.
Also provided is an apparatus for splicing two sections of a multi-layered laminated sheet material wherein each section of the material comprises at least three layers each having first and second surfaces and wherein the at least three layers comprise two outer layers and at least one inner layer located between the two outer layers, the apparatus comprising: a first splicer configured to apply a splicing material to the two outer layers of the multi-layered laminated sheet material, a delaminator configured to remove a first outer layer, a second splicer located downstream of the delaminator configured to apply a splicing material to the exposed inner layer and an applicator located downstream of the second splicer configured to reapply an outer layer to the exposed inner layer.

17 Claims, 2 Drawing Sheets

(58) Field of Classification Search
CPC ............ B65H 19/1852; B65H 19/1873; B65H 2301/46017; B65H 2301/4631; B65H 2406/32; B32B 2535/00; B32B 37/02; B32B 37/12; B32B 37/203; B32B 38/10
See application file for complete search history.

METHOD OF SPLICING A MULTI-LAYERED LAMINATE MATERIAL, SPLICED MULTI-LAYERED LAMINATE MATERIAL AND APPARATUS FOR SPLICING A MULTI-LAYERED LAMINATE MATERIAL

CROSS-REFERENCE TO RELATED APPLICATIONS

This application is a continuation of U.S. application Ser. No. 18/273,160, filed Jul. 19, 2023, which is a U.S. national stage application of International Patent Application No. PCT/EP2022/051370, filed Jan. 21, 2022 and now Publication No. WO 2022/157325, which claims priority to U.K. Provisional Application No. 2100822.2 filed on Jan. 21, 2021; the disclosures of which are hereby incorporated by reference in their entirety.

FIELD

Embodiments of the present disclosure relate to methods for the splicing of multi-layered laminated materials, their use in wound dressings and apparatus for use in the methods for the splicing of multi-layered laminated materials.

BACKGROUND

Components for wound dressings are commonly multi-layered laminates. The material is supplied in the form of slit reels to the manufacturing process. Due to the nature of the material, existing automated splicing systems are not suitable, as they only join the outer surfaces. In order to join multilayer raw material reels, a laborious, manual splice of each layer of the laminate material must be carried out.

At the joint of new and old reels, the individual layers must be separated in order to allow downstream delamination and removal to waste of the outer layers and consequently each individual layer must be joined to each other and be discrete from the other layers. The manual splice requires the new and old reels to be stationary for a period of time to allow an operator to separate/delaminate the layers and apply a laminating material across their respective joins.

Having the reels stationary for this lengthy, manual splicing process requires the whole process to be stationary. The alternative (to allow the process as a whole to continue through the splicing process) is to create a buffer of material, downstream from the splicing position. This buffer is known as a “festoon” and its purpose is to allow the downstream process to remain in motion, by feeding out the stored material, whilst the upstream, manual splice is performed. For high speeds, a very large capacity festoon is required. However, as the reels are limited in length, at high speeds (either with or without a festoon), the operator performing the splicing will be fully occupied in this task and will have little, if any time to perform other roles. The higher the speed, the more frequent is the need to perform a splice. Resultant low process efficiency is likely. A failed splice results in a costly loss of operational efficiency and material waste.

After the layer internal splicing process step(s), to recreate the original raw material construction, the original outer layers need to be re-laminated. These outer layers then need to be removed again at a subsequent delamination position, prior to the lamination of the final outer layers. This requires additional, costly equipment and a more complex production process, both of which lead to the increased risk of process waste.

It is therefore desirable to improve efficiency on existing processes, and facilitate new, high speed, high efficiency processes in the future.

DETAILED DESCRIPTION

Embodiments disclosed herein relate to methods for splicing an upstream section and a downstream section of a multi-layered laminated sheet material wherein each section of the material comprises at least three layers each having first and second surfaces and wherein the at least three layers comprise first and second outer layers and at least one inner layer located between the first and second outer layers, comprising the steps of a) splicing together the upstream and downstream sections of both the first and second outer layers with a splicing material, b) removing the first outer layer from the multi-layered laminated sheet material to expose a surface of an inner layer, c) splicing the upstream and downstream sections of the exposed inner layer with a splicing material, d) applying a replacement first outer layer to the exposed surface of the inner layer.

Steps b) and c) may be repeated to splice a multi-layered laminated sheet material having greater than three layers wherein by removing a first outer layer and splicing the exposed inner layer, the spliced inner layer becomes an outer layer and may be removed in step b). For each repetition of steps b) and c), step d) is also subsequently repeated.

The method is preferably carried out by a machine.

Automated splicing machines are known in the art and any suitable splicing machine may be used. An automated splicing system may require the temporary stoppage of the laminated sheet material at the point of splice, meaning a festoon of suitable capacity will be required to ensure that the downstream processes do not have to stop. Steps a) and c) may both be performed by an automated splicing machine. Alternatively, one or more of the steps may be carried out manually. In particular, one or more of the splicing steps may be carried out manually. Even with a manual splicing process, the method may be performed more quickly than by conventional means allowing the process to be performed more efficiently and with less manpower. The method is preferably automated. By automated is intended to mean that the process is operated by largely automatic equipment, i.e. the process may be carried out with minimal or no human intervention.

The multi-layered-laminated sheet material may be spliced using any suitable splicing material. Preferably the splicing material is an adhesive tape, preferably a self-adhesive tape. Suitable splicing materials will be known to the person skilled in the art and will vary according to the material to be spliced.

In step a) the outer layers may be spliced simultaneously or a splice may be applied to first one side and then the other in succession.

After step a) and/or after step c) the multi-layered laminated sheet material may be pressed to ensure a strong bond across the splice. This may be achieved by any suitable means, for example by passing the multi-layered laminated sheet material through a pair of lamination rollers.

Preferably the method is a continuous process. By continuous is meant that it is substantially unnecessary to pause the manufacturing process to perform one or more of the steps. The process may be slowed to allow certain steps to be carried out manually. A festoon may be used to allow the process downstream to continue whilst the manual steps are carried out. If either of the splicing steps are carried out manually, the process may be paused at one or both of steps a) and c). A festoon may be used at either step or at both steps.

The multi-layered laminated sheet material preferably travels along a predetermined path through each of the steps of the method. The path may be predetermined by any suitable means, for example by means of rollers, a conveyor belt, vacuums etc. The multi-layered laminated sheet material may be under tension through the manufacturing process. The multi-layered laminated sheet material typically travels at a speed of 1 m/minute to 50 m/minute through the process defined by the steps of the method.

In step b) the first outer layer may preferably continue on a first trajectory and the second outer layer and inner layer(s) may be removed in an arcuate path away from the first trajectory. Without wishing to be bound by theory, by retaining the first outer layer and removing the inner layer(s) and second outer layer on an arcuate path the removal of the first outer layer is less likely to cause delamination of the inner layer(s) and second outer layer. Preferably the first outer layer continues in astraight line from the delamination point. Preferably the second outer layer and inner layer(s) at least partially double back on themselves when following the arcuate path, i.e. the angle between the first trajectory and the trajectory of the inner layer(s) and second outer layer after their removal is less than 90°, preferably the angle is 0-45°, more preferably 0-30°, 0-20°, or 0-10°, most preferably 0-5°. Preferably the second outer layer and inner layers almost entirely double back on themselves, i.e. the downstream trajectory of the second outer layer and inner layer(s) is substantially parallel and opposite to the first trajectory. Without wishing to be bound by theory, it is believed that minimising the angle between the first trajectory and the downstream trajectory of the second outer layer and the inner layer(s) reduces the potential risk of failure of the delamination step. The inner layer(s) and second outer layer may be removed in a free loop, i.e. without a physical pivot. The free loop may be controlled by any suitable means, for example by altering the upstream and/or downstream speed at which the multi-layered laminated sheet is fed through the system. Alternatively, the inner layer(s) and second outer layer may be removed at a particular point defined by either a fixed or floating means. The fixed or floating means may be a roller or a blade or any other suitable means.

The first outer layer may be retained by physical means whilst the inner layers and second outer layer are removed. The physical means may be any suitable means. For example, the first outer layer may be retained by rollers or by a vacuum applied to a surface on which the first outer layer is located.

Subsequent to step d), the second outer layer may be removed in an analogous process to the removal of the first outer layer if the second outer layer is not required in the final product. The second outer layer may preferably continue on a second trajectory and the replacement outer layer and inner layer(s) may be removed in an arcuate path away from the second trajectory.

In the multi-layered laminated sheet material the second surface of the first outer layer is preferably in contact with a surface of an inner layer and the first surface of the second outer layer is in contact with a second surface of an inner layer. The layers of the multi-layered laminated sheet material may each be removed as a single intact layer however it is to be understood that each layer of the multi-layered laminated sheet material may itself comprise multiple layers and comprise more than one different material.

The at least one inner layer may have an adhesive layer applied to one or more surfaces of the inner layer. Preferably the at least one inner layer has an adhesive layer present on both surfaces of the inner layer.

In certain embodiments, different adhesive layers are present on each surface of the at least one inner layer. The different adhesive layers may have different stripping loads. The stripping load may be measured by taking a sample of the adhesive sheet and delaminating a portion of the layer present on the relevant adhesive layer. The delaminated layer is placed in the upper jaw of a tensile tester machine and the adhesive layer in the lower jaw of a tensile tester. The upper and lower jaws of the tensile tester machine are orientated at 180° to one another with the laminated portion of the sample located between the jaws and supported at an angle of 90° to both jaws. The sample is peeled at a rate of 300 mm/min with the force required measured by the tensile tester machine. The results are expressed as average peel force per unit width. The stripping load may be defined as the average load per unit width of bond line required to separate progressively one layer from another at a separation angle of (approximately) 180° and at a separation rate of 300 mm/min. It is expressed as grams force per cm of width.

Preferably the first outer layer corresponds to the outer layer applied to the surface of the at least one inner layer comprising the adhesive with the lowest stripping load.

The adhesive(s) may be any adhesive(s) suitable for the end use of the multi-layered laminated sheet material. Where the multi-layered laminated sheet material is for use in a wound dressing, preferably one or more of the adhesive layers may be a pressure sensitive adhesive. Aptly the pressure sensitive adhesive layer may be formed from an adhesive which is biocompatible. Suitable adhesives include silicone, hot melt, hydrocolloid or acrylic based adhesive.

Preferably one or more of the adhesive layers may be a wound contacting adhesive. The wound contacting adhesive may be a silicone or acrylic adhesive, typically a silicone adhesive. In particularly preferred embodiments, one adhesive may be a pressure sensitive adhesive and one adhesive may be a silicone wound contacting adhesive. In such instances, the silicone wound contacting adhesive will typically have a lower stripping load than the pressure sensitive adhesive.

Preferably the outer layers are release liners for the adhesive layers applied to the inner layer(s). The release liner may be any suitable material, typically a polymer film such as a polypropylene film or coated paper. Preferably the release liners are silicone coated release liners. Preferably the outer layers have a thickness of 50-200 microns.

When the first outer layer is reapplied in step d), the reapplied first outer layer may be a different outer layer to the original first outer layer which was removed. The reapplied first outer layer may advantageously be an outer layer which is of use in the final product. For example, in a wound dressing the reapplied outer layer may be a release liner useful in the end use of the wound dressing such as a release liner with adhesive free handles. Advantageously, this allows the final outer layer to be applied at the earliest opportunity after completion of the internal layer splice(s). The reapplied first outer layer can then be used to provide support during further downstream delamination processes on the opposing side of the laminated sheet material. The present invention therefore avoids the need to reapply the unwanted outer layer after the completion of the internal splice(s). Advantageously, the present invention seeks to maximise process efficiency by minimising machine complexity and raw material wastage.

In certain embodiments, steps c) and d) may be combined by applying a splicing material to the exposed inner layer simultaneously with the replacement first outer layer. For example, the splicing material in step c) may be a splicing material capable of adhering to both the exposed inner layer and the replacement first outer layer. The splicing material may first be applied to the replacement first outer layer. For example, the splicing material may be a double-sided splicing material.

Preferably the at least one inner layer comprises a polymer film, preferably a polyurethane film.

Preferably the multi-layered laminated sheet material comprises three layers. Preferably the multi-layered laminated sheet material comprises three layers, wherein the inner layer has an adhesive layer applied to both surfaces of the inner layer and a different adhesive is applied to each surface of the inner layer.

The multi-layered laminated sheet material may be perforated. Preferably each layer of the multi-layered laminated sheet is perforated, preferably the perforations in each layer are coincident.

The multi-layered laminated sheet material is preferably a component of a wound dressing. More preferably a wound contact layer.

According to a second embodiment is provided a spliced multi-layered laminated sheet material produced according to the method of any earlier embodiment. According to a further embodiment is provided a wound dressing comprising a material according to the second embodiment.

Further preferred features of the spliced multi-layered laminated sheet material of the second aspect are defined hereinabove in relation to the first aspect and may be combined in any combination.

According to a third embodiment is provided apparatus for splicing two sections of a multi-layered laminated sheet material wherein each section of the material comprises at least three layers each having first and second surfaces and wherein the at least three layers comprise two outer layers and at least one inner layer located between the two outer layers, the apparatus comprising: a first splicer configured to apply a splicing material to the two outer layers of the multi-layered laminated sheet material, a delaminator configured to remove a first outer layer, a second splicer located downstream of the delaminator configured to apply a splicing material to the exposed inner layer and an applicator located downstream of the second splicer configured to reapply an outer layer to the exposed inner layer. Preferably the apparatus is suitable for use in a continuous process.

Preferably the first and/or second splicer is an automatic splicer. Suitable automatic splicers are known to those skilled in the art.

Preferably the delaminator comprises means for retaining the first outer layer. Suitable means are known to one skilled in the art but include a vacuum applied from beneath a surface on which the first outer layer is located or one or more rollers.

The delaminator may further comprise means for removing the inner layer(s) and second outer layer in an arcuate path away from the first outer layer. Suitable means include rollers and blades. The means may be located distally from the point at which delamination occurs to enable the inner layer(s) and second outer layer to be removed in a free loop. Alternatively, the point of delamination may be determined by a floating or fixed roller or blade or other suitable means located at the point of delamination. Preferably the apparatus is arranged such that the second outer layer and inner layer(s) at least partially double back on themselves when following the arcuate path, i.e. the angle between the trajectory of the multi-layered laminated sheet material entering the delaminator and the trajectory of the inner layer(s) and second outer layer on exiting the delaminator, i.e. after their removal from the first outer layer, is less than 90°, preferably the angle is 0-45°, more preferably 0-30°, 0-20°, or 0-10°, most preferably 0-5°. Preferably the second outer layer and inner layers almost entirely double back on themselves, i.e. the downstream trajectory of the second outer layer and inner layer(s) is substantially parallel and opposite to the first trajectory.

Preferably the apparatus further comprises means for ensuring that the splicing material has formed a strong splice downstream of one or more of the splicers. Suitable means include nip rollers.

Preferably the apparatus further comprises means for ensuring that the multi-layered laminated sheet material follows a predetermined path through the apparatus. Suitable means will be known to those skilled in the art but include rollers, blades and conveyor belts.

The apparatus may comprise a processor and a memory, the memory storing instructions which when executed by the processor cause the apparatus to carry out any of the methods disclosed herein.

Further preferred features of the components required in the apparatus of the third aspect are defined hereinabove in relation to the first and second aspects and may be combined in any combination.

According to another aspect of the invention, there is provided a computer-readable storage medium comprising instructions, which when executed, cause the apparatus defined in the third aspect to perform any of the methods defined herein. The computer-readable storage medium may be non-transitory.

BRIEF DESCRIPTION OF THE DRAWINGS

Embodiments of the present disclosure will now be described hereinafter, by way of example only, with reference to the accompanying drawings in which.

Figure 1:
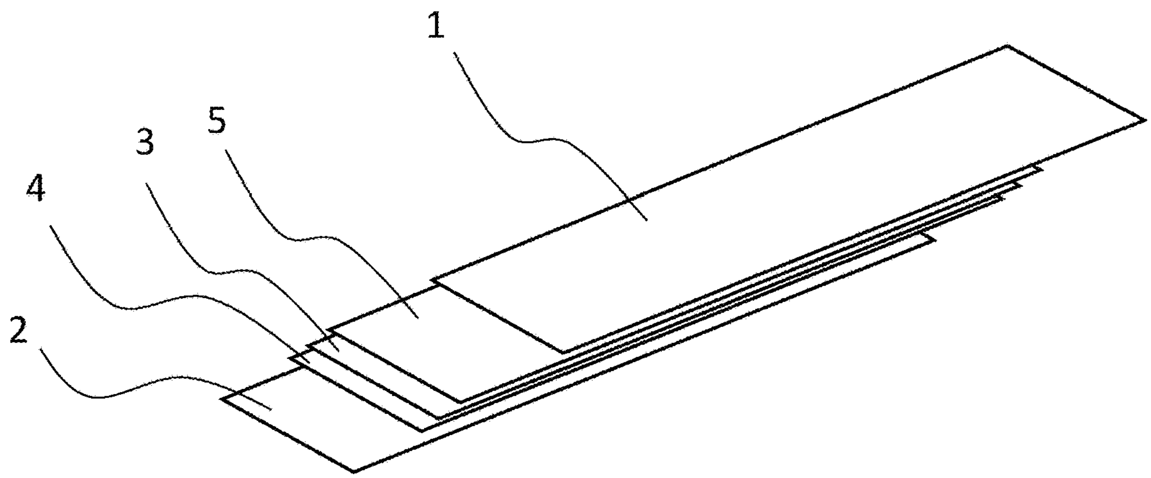
FIG. 1 illustrates a multi-layered laminated sheet material according to some embodiments.

In the drawings, corresponding reference characters indicate corresponding components. The skilled person will appreciate that elements in the figures are illustrated for simplicity and clarity and have not necessarily been drawn to scale. For example, the dimensions of some of the elements in the figures may be exaggerated relative to other elements to help to improve understanding of various example embodiments. Also, common but well-understood elements that are useful or necessary in a commercially feasible embodiment are often not depicted in order to facilitate a less obstructed view of these various example embodiments.

DESCRIPTION OF EMBODIMENTS

An example of a multi-layered laminated sheet material is shown in FIG. 1 in which the outer layers (1, 2) are silicone coated release liners, the inner layer (3) is a polyurethane film coated on the first surface (4) with a silicone adhesive and on the second surface with a pressure sensitive adhesive (5). The first outer layer (1) comprises two sections and forms non adhesive handles for ease of removal in use. The first surface of the inner layer is the wound contact layer.

Figure 2:
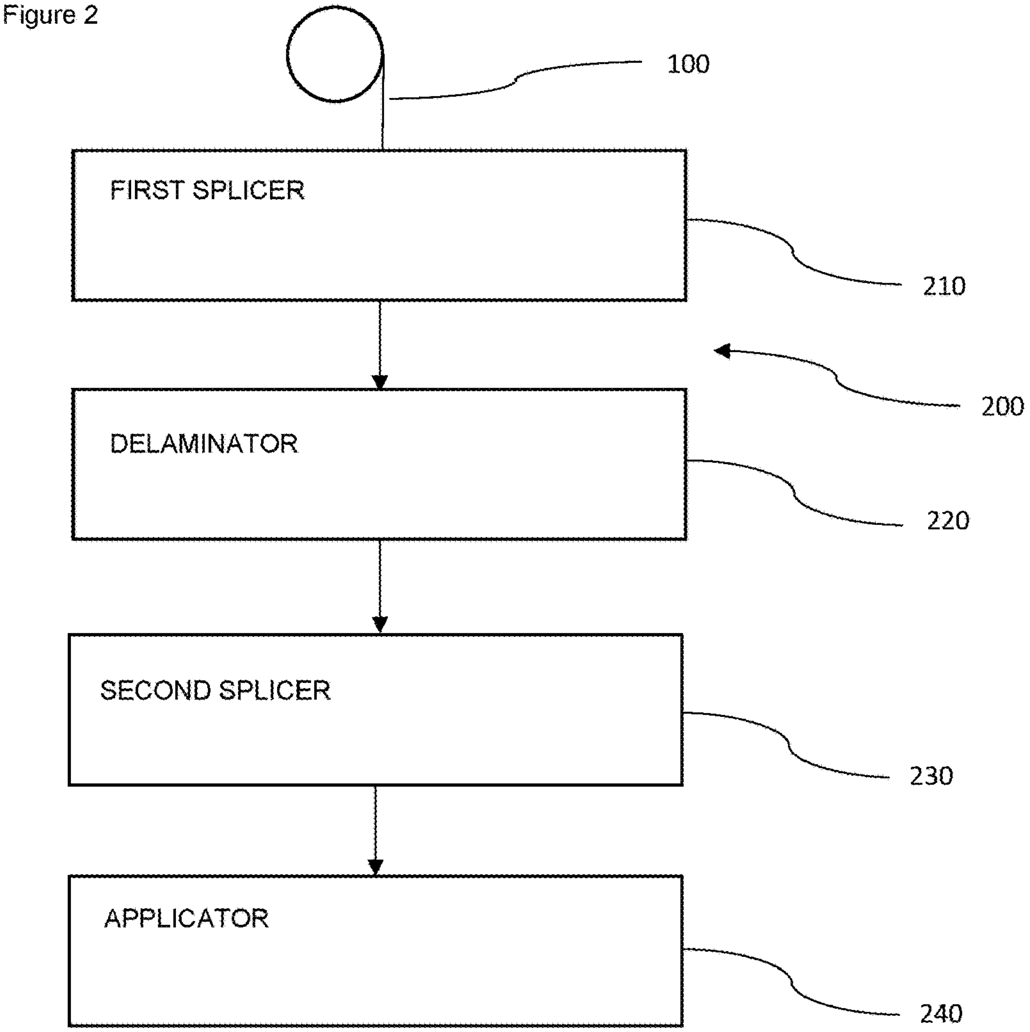
FIG. 2 is a schematic block diagram of an exemplary apparatus according to some embodiments and suitable for use according to the method of some embodiments.
Figure 3:
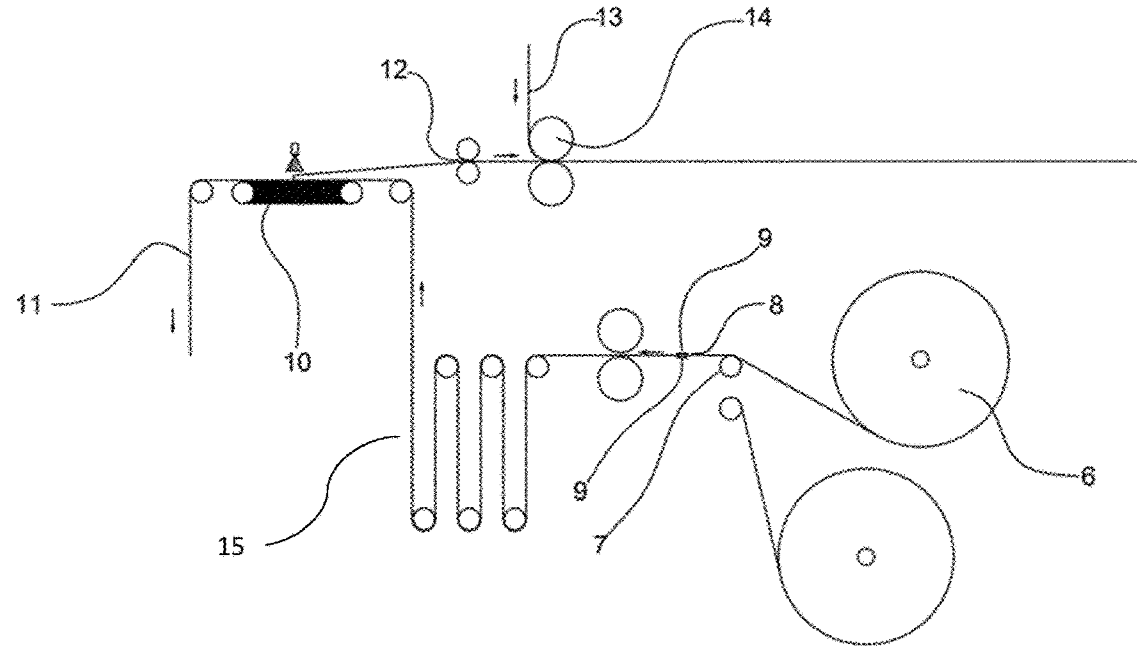
FIG. 3 illustrates apparatus according to some embodiments and suitable for use according to the method of some embodiments.

The method may be performed using an apparatus as shown in FIGS. 2 and 3. FIG. 2 is a schematic representation of an apparatus 200 for the splicing of a multi-layered laminated sheet material 100. The apparatus 200 comprises a first splicer 210, delaminator 220, second splicer 230 and applicator 240. The apparatus may take the form of a machine or a combination or series of machines arranged in a production line and suitable for mass production. A multi-layered laminated sheet material comprising upstream and downstream sections is fed into the first splicer where a splicing material is applied to the outer layers of the laminate joining the upstream and downstream sections of both layers. The spliced material is then fed into the delaminator where a first outer layer is removed to waste exposing an inner layer. The remaining layers of the multi-layered laminated material are then fed into the second splicer where a splicing material is applied to the exposed inner layer of the laminate joining the upstream and downstream sections of the exposed inner layer. The spliced laminate is then fed into the applicator where an outer layer is applied to the exposed surface of the spliced inner layer, replacing the first outer layer which was removed by the delaminator. FIG. 3 illustrates this process in more detail. The multi-layered laminated sheet material (6) is unwound onto roller (7). The outer layers are spliced using a first splicer at a first splicing point (8) with splice tape (9). The spliced laminate travels through a festoon (15) to a delaminator comprising a vacuum conveyor (10) which retains the first outer layer (11) which runs to waste. The inner layer and second outer layer are removed in an arcuate path to a second splicer at a second splicing point (12) where a splice tape is applied to the exposed inner layer. A replacement outer layer (13) is unwound by an applicator onto the exposed surface of the inner layer and nip rollers (14) ensure that the splice forms a strong bond.

Figure 4:
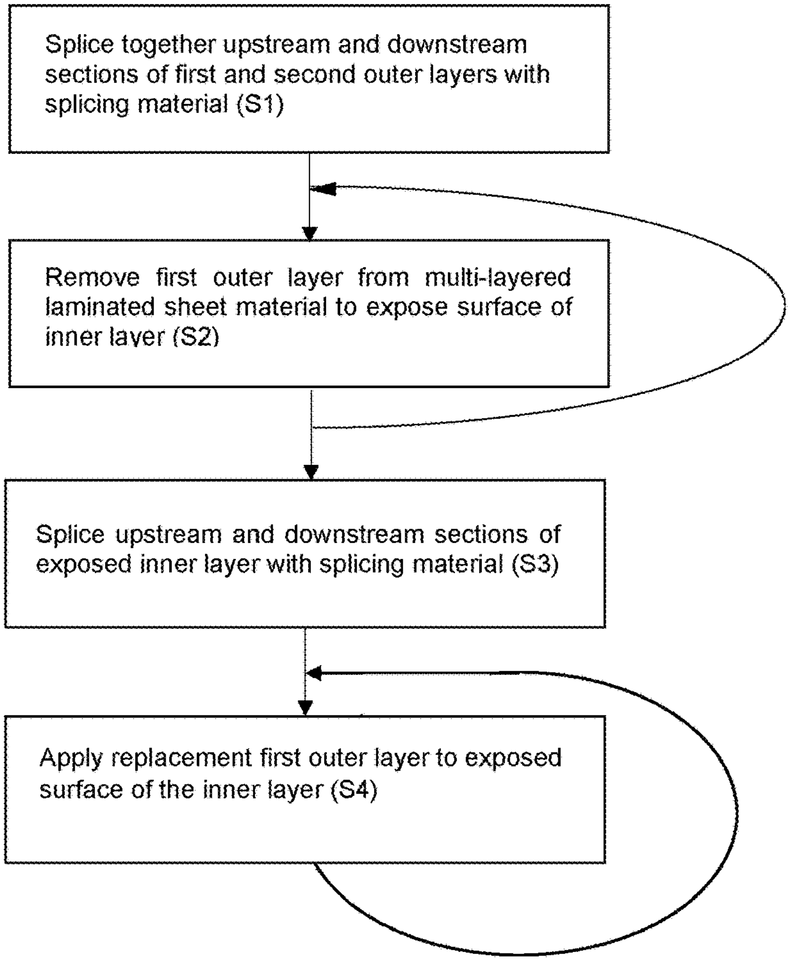
FIG. 4. is a flow chart illustrating the steps of the method according to some embodiments.

FIG. 4 illustrates an example method for splicing an upstream section and a downstream section of a multi-layered laminated sheet material wherein each section of the material comprises at least three layers each having first and second surfaces and wherein the at least three layers comprise first and second outer layers and at least one inner layer located between the first and second outer layers. The method comprises a step S1 which includes splicing together the upstream and downstream sections of both the first and second outer layers with a splicing material; step S2 which includes removing the first outer layer from the multi-layered laminated sheet material to expose a surface of an inner layer; step S3 which includes splicing the upstream and downstream sections of the exposed inner layer with a splicing material; and a step S4 which includes applying a replacement first outer layer to the exposed surface of the inner layer.

Although the present disclosure includes certain embodiments, examples and applications, it will be understood by those skilled in the art that the present disclosure extends beyond the specifically disclosed embodiments to other alternative embodiments or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

Conditional language, such as "can," "could," "might," or "may," unless specifically stated otherwise, or otherwise understood within the context as used, is generally intended to convey that certain embodiments include, while other embodiments do not include, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The terms "laminate" and "laminated sheet material" are used interchangeably.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The invention claimed is:

1. A multi-layered laminated material comprising:

a first outer layer;

a second outer layer comprising spliced upstream and downstream sections; and at least one inner layer located between the first and second outer layers, wherein upstream and downstream sections of the at least one inner layer are spliced after exposing the at least one inner layer, and wherein the first outer layer comprises a replacement outer layer applied to the exposed the inner layer.

2. The material of claim 1, wherein a bottom surface of the first outer layer is in contact with a top surface of an inner layer and a top surface of the second outer layer is in contact with a bottom surface of an inner layer.

3. The material of claim 1, wherein at least one inner layer has an adhesive layer applied to one or more surfaces of the inner layer.

4. The material of claim 3, wherein the at least one inner layer comprises a first surface with a first adhesive layer and a second surface with a second adhesive layer.

5. The material of claim 4, wherein the first and second adhesive layers are different.

6. The material of claim 5, where the second outer layer corresponds to the outer layer applied to the surface of the inner layer comprising the adhesive with the highest stripping load.

7. The material of claim 1, wherein the multi-layered laminated material consists of three layers.

8. The material of claim 1, wherein the multi-layered laminated material is a component of a wound dressing.

9. The material of claim 8, wherein the multi-layered laminated material is a wound contact layer of the wound dressing.

10. The material of claim 1, wherein the multi-layered laminated material is a sheet material.

11. The material of claim 1, wherein the material is made in a continuous process carried out by a machine.

12. A method for splicing an upstream section and a downstream section of a multi-layered laminated material comprising at least three layers, wherein the at least three layers comprise first and second outer layers and at least one inner layer located between the first and second outer layers, comprising the steps of:

a. splicing together the upstream and downstream sections of both the first and second outer layers;
b. exposing a surface of an inner layer;
c. splicing the upstream and downstream sections of the exposed inner layer; and
d. applying a replacement outer layer.

13. The method of claim 12, wherein the method is carried out by a machine.

14. The method of claim 12, wherein the method is a continuous process.

15. The method of claim 12, wherein in step (b) the first outer layer continues on a first trajectory and the second outer layer and inner layer(s) are removed in an arcuate path away from the first trajectory.

16. The method of claim 15, wherein the first outer layer is retained on a surface by an external force.

17. The method of claim 16, the external force is a vacuum.

* * * * *